W. BEANEY.
TIRE.
APPLICATION FILED NOV. 18, 1921.
1,412,601. Patented Apr. 11, 1922.
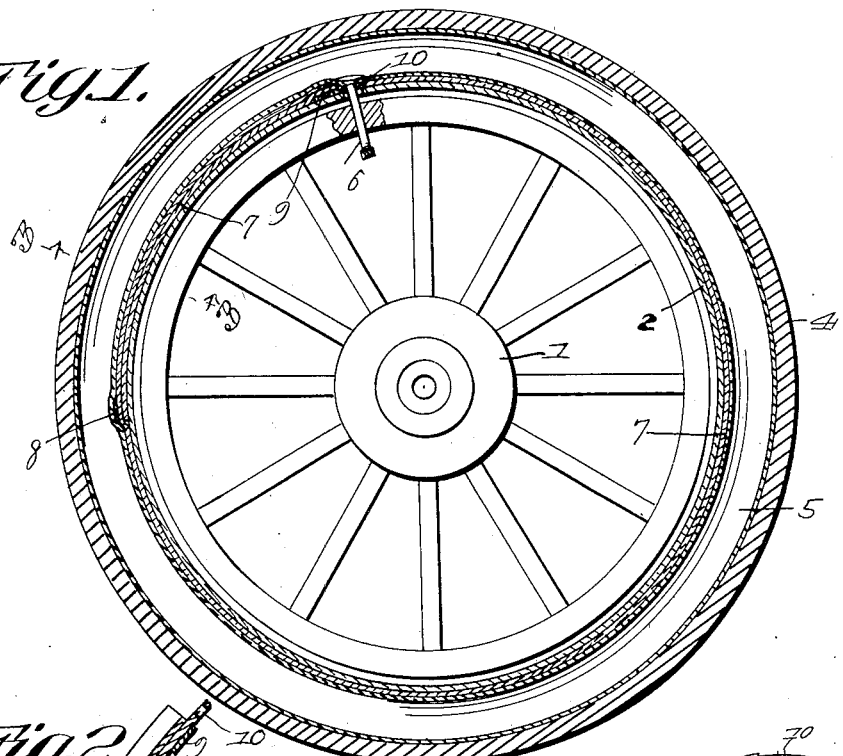
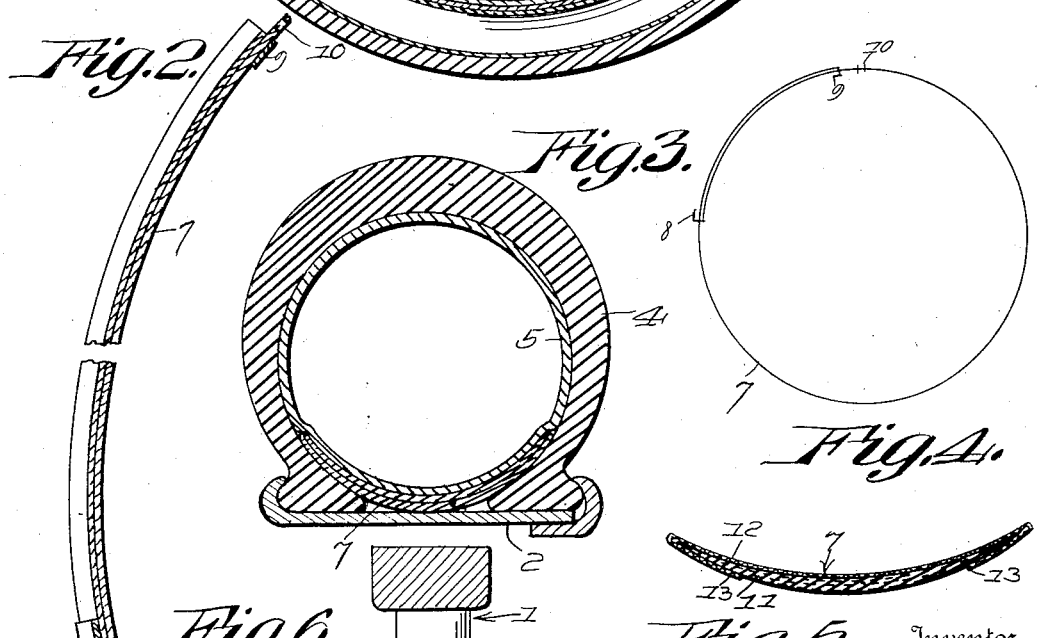
Inventor
William Beaney

UNITED STATES PATENT OFFICE.

WILLIAM BEANEY, OF NEW YORK, N. Y.

TIRE.

REISSUED 1,412,601.

Specification of Letters Patent. Patented Apr. 11, 1922.

Application filed November 18, 1921. Serial No. 516,176.

*To all whom it may concern:*

Be it known that I, WILLIAM BEANEY, a citizen of the United States, residing at New York, in the county of Manhattan and State of New York, have invented certain new and useful Improvements in Tires, of which the following is a specification.

This invention relates to improvements in motor vehicle tires and more particularly to a liner or flap constructed to be placed between the inner tube and rim.

It is well known that liners or flaps have been used prior to the present time for maintaining the inner tube out of contact with the metal rim and for preventing pinching of the tube between the inner edges of the tire casing and between said edges and said rim. These known constructions however, have been formed of a strip of material adapted to be wrapped to form a liner between the tube and rim. Some of the known devices have been provided with means to permit adjustment of the same to accommodate expansion and contraction of the inner tube but in this adjustable type of liner, the liner after being used for some time shortens in length owing to the shrinkage of the fabric from which it is made, and when this occurs the apertures in the liner cannot be brought into alinement to be passed over the valve stem of the inner tube. Further than this, in the liners heretofore used, both ends of the liner will not automatically adjust themselves when the tire is being inflated, and consequently wrinkles and the like are formed in the liner and these wrinkles tend to rub against the inner tube and cause puncturing of the same.

From practical experience in connection with the liners heretofore known, I have recognized the defects and disadvantages of the same, and it is the primary object of the present invention to provide an improved liner which will overcome these disadvantages.

Some of the objects of my invention are to provide an endless automatically adjustable flap or liner that will fit any size or make of automobile tire or tube without causing pinching or rubbing of the pneumatic inner tube. The liner is so constructed that it may be used for the life of a tire regardless of the amount of punctures, and it automatically adjusts itself to any automobile tire, tube or rim regardless of stretching of the liner through wear and the like. The present flap will remain stationary at all time after it has adjusted itself during the inflation of the tire. The liner may be manufactured of any suitable fabric or material and is preferably made of the fabrics now employed in the known types of liners. The improved liner can be manufactured at a cost approximately equal to the manufacturing cost of flaps now on the market.

A further object of the invention is to provide a liner consisting of an endless relatively stiff fabric band that is capable of automatically adjusting itself to snugly engage the rim and inner tube when said inner tube is inflated.

With the foregoing objects outlined and with other objects in view which will appear as the description proceeds, the invention consists in the novel features hereinafter described in detail, illustrated in the accompanying drawing and more particularly pointed out in the appended claims.

Referring to the drawing:

Figure 1 is a side view of a wheel with a tire, employing my improved liner mounted thereon, and the tire, rim and liner are shown in section.

Fig. 2 is an enlarged sectional view of a portion of the liner and illustrating the manner in which the circumference of the liner is adjusted.

Fig. 3 is a transverse sectional view taken on line 3—3 of Fig. 1.

Fig. 4 is a side view of the improved liner detached from the tire.

Fig. 5 is a transverse sectional view of the liner and illustrating the manner in which the same is manufactured.

Fig. 6 is a detail perspective view showing the loop at one end of the band.

Fig. 7 is a similar view showing the loop at the other end of the band.

In the drawing, 1 designates a motor vehicle having a rim 2 carrying a tire 3, consisting of a casing 4 and an inner tube 5 having a valve tube 6. All of these parts are of known construction and they need not be modified or altered to accommodate my improved liner, which will now be described.

The liner or flap is shown at 7 and it consists of an annular band formed of a strip of laminated fabric and preferably provided at its ends with loops 8 and 9, the former of which projects outwardly to surround a portion of the strip, and the latter of which extends inwardly to surround another portion of the strip. It will be understood that these loops permit the ends of the strip to move toward or away from one another in order to accommodate tires of different sizes and types and to allow automatic adjustment of the flap when the inner tube is being inflated. The flap is provided with an aperture 10 to permit the passage of the valve tube 6 and it will be understood that when the valve tube is passed through the hole 10, said valve tube will hold a portion of the liner from movement while its end portions slide to accord with the size of the tire.

As best shown in Figure 5, the body of the liner is preferably formed of laminated strips 11 of rubberized fabric and a cover 12 of some soft material such as flannel, is placed over the laminated strips and has its side edges turned inwardly to engage the inner face of the superposed laminated strips as shown at 13. By making the body of laminated strips, a relatively stiff adjustable endless band is provided and when this band is placed in a tire between the rim and inner tube, the loops 8 and 9 will automatically operate, when the inner tube is inflated, to cause the liner or flap to snugly fit the rim and tube.

When the liner has been placed in position, and the tube has been inflated, the liner will function to maintain the tube out of contact with the rim and also out of contact with the inner edges of the casing, and as the liner automatically adjusts itself to snugly fit the rim and tube, a smooth surface of the liner will be in engagement with the tube, so that there will be no danger of injuring the latter by pinching or rubbing the same.

From the foregoing I believe that the construction, operation and advantages of the invention may be readily understood by those skilled in the art, and I am aware that the various changes may be made in the details disclosed without departing from the spirit of the invention as expressed in the following claims.

What I claim and desire to secure by Letters-Patent is:

1. In combination, a rim, a tire casing mounted on said rim, a pneumatic inner tube arranged within the casing, a strip of flexible material capable of conforming to the changing shape of the tire longitudinally and transversely during inflation and lying between and unconnected with the inner tube and casing and bridging the space between the side edges of the casing, said strip extending entirely around the rim and having its ends overlapped, flexible means connected to one extremity of said strip and slidably engaging the other end portion of the strip, and other flexible means connected to the other extremity of the strip and slidably engaging the opposite end portion of said strip.

2. A combination as claimed in claim 1 in which said flexible means include straps, one strap being arranged on the inner side of the strip and the other strap being arranged on the outer side of the strip.

3. A flap adapted to be placed between an inner tube and a tire casing to prevent pinching of the tube comprising a strip of flexible material capable of conforming to the changing shape of a tire longitudinally and transversely during inflation and adapted to extend entirely around the rim and having its ends overlapped, a transverse flexible strap connected to one extremity of said strip and slidably engaging the other end portion of the strip, and another transverse flexible strap connected to the other extremity of the strip and slidably engaging the opposite end portion of said strip, one of said straps being arranged on the outer side of the strip and the other strap being arranged on the inner side thereof, and said strip being provided intermediate its ends with an aperture to permit the passage of a valve stem therethrough.

4. A flap adapted to be placed between an inner tube and a tire casing to prevent pinching of the tube and hold the tube out of contact with the wheel rim comprising a strip of flexible material capable of conforming to the changing shape of a tire longitudinally and transversly during inflation and adapted to extend entirely around the rim and having its ends overlapped, said strip being provided intermediate its ends with a valve stem aperture and means connecting the end portions of said strip and capable of permitting both ends of said strip to automatically adjust themselves circumferentially while the tire is being inflated.

In testimony whereof I affix my signature.

WILLIAM BEANEY.